3,510,502
POLYMERIC GERMANOSILOXANES

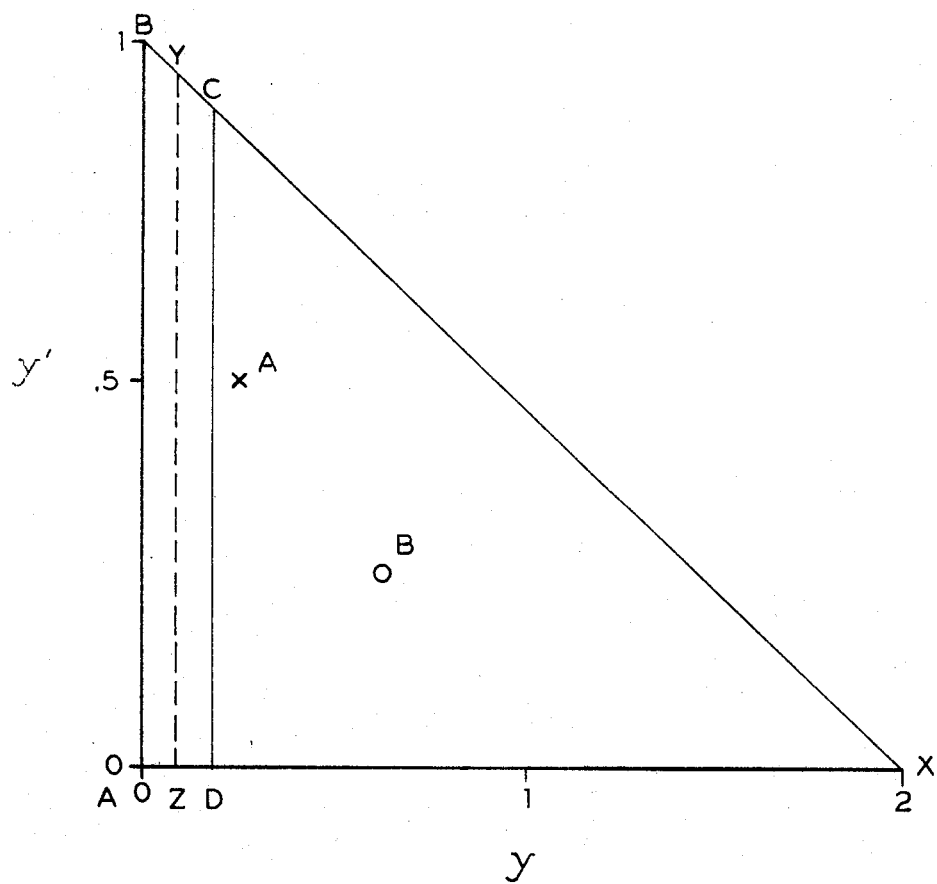

Kurt Moedritzer, Webster Groves, Mo., assignor to Monsanto Company, St. Louis, Mo., a corporation of Delaware
Filed June 12, 1967, Ser. No. 645,313
Int. Cl. C07f 7/00; C07d 103/00
U.S. Cl. 260—429             16 Claims

ABSTRACT OF THE DISCLOSURE

Polymeric dihydrocarbyl germanosiloxane compositions having the general formula

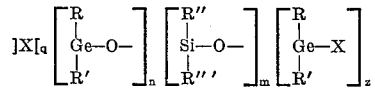

in which R, R', R" and R'" are selected from the group consisting of hydrocarbyl radicals having from 1 to 20 carbon atoms, and phenyl and substituted phenyl radicals having from 6 to 20 carbon atoms; X is selected from the group consisting of fluorine, chlorine, bromine, alkoxyl, thioalkyl, dialkylamino, and cyano, in which the alkyl radicals have from 1 to 20 carbon atoms, and $n$ plus $m$ are numbers totaling from 1 to 100, $q$ and $z$ are equal and are whole numbers from zero to one.

The products are useful as functional fluids, such as heat transfer media, lubricants and hydraulic fluids.

---

The present invention relates to novel polymeric germanium, silicon and oxygen containing compounds of the dihydrocarbyl germanosiloxane type.

According to the invention, there are provided new and valuable germanium, silicon and oxygen containing compounds having the general formula:

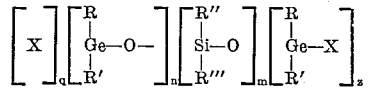

in which R, R', R" and R'" are alike or different, and are selected from the group consisting of hydrocarbyl radicals having from 1 to 20 carbon atoms, such as alkyl and alkenyl radicals having from 1 to 20 carbon atoms, and phenyl and substituted phenyl radicals having from 6 to 20 carbon atoms; X is a halogen such as fluorine, chloride, bromine and iodine as well as alkoxyl, thioalkyl, dialkylamino, and cyano, groups in which the alkyl radicals have from 1 to 20 carbon atoms, and $n$ and $m$ are alike or different, with $n$ plus $m$ being numbers totaling from 1 to 100. The symbols $q$ and $z$ are whole numbers from zero to one (e.g., zero is considered to be a whole number), and $q$ is equal to $z$. Thus $q$ and $z$ have the value of one for the linear molecules, and zero for cyclic molecules.

In the linear chain polymeric compositions the germanium and silicon moieties are located randomly along the chain, although germanium appears predominantly at the terminal positions of the linear polymeric compositions.

As examples of linear compositions under the above general formula, when $n=1$, $m=1$, $q=z=1$, and $$R=R'=R''=R'''=CH_3$$

the chlorine substituted product is a trimer with 2 germanium atoms and 1 silicon atom, for example

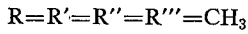
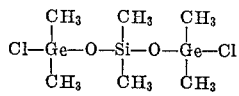

having a molecular weight of 367. Representative examples of R, R', R" and R'" are methyl, ethyl, propyl, butyl and longer chain radicals such as decyl, dodecyl as well as the corresponding unsaturated radicals such as butenyl, cyclohexenyl, phenyl, ethylphenyl, tolyl and xylyl radicals. In germanosiloxane chains of the type described herein the distribution of silicon and germanium atoms within the various chain molecules is random. As shown by proton nuclear magnetic resonance spectra, and as confirmed by calculations, germanium atoms have been found to prefer to be at the ends of chains whereas silicon atoms tend to be found within the chains. Consequently, the polymeric compositions described herein as having germanium in the terminating groups are the predominant components of the reaction mixture.

A preferred method of preparation of the novel chain type polymeric dihydrocarbyl germanosilicon oxides utilizes a disubstituted dihydrocarbyl silane and a tetrameric cyclodihydrocarbyl germanium oxide as the starting materials. The silane material such as a di-substituted dialkyl silane is employed in the mol proportion of 0.03:1 to 30:1 relative to one part of the tetrameric cyclohydrocarbyl germanium oxide. Larger proportions of the tetrameric cyclodihydrocarbyl germanium oxide (e.g., smaller ratios, as herein defined) favor the production of higher linear polymeric products. This correlates with small values of $y$ in FIG. 1. These two components are reacted at a temperature of from 10° C. to 300° C. The linear chain type polymeric germanosiloxanes which result exist as dimeric, trimeric, tetrameric, pentameric, hexameric, heptameric, octameric, nonameric, decameric and higher forms. As an example, octaethyltetragermanium tetroxide is reacted at 200° C. with dichlorodiethyl silane to obtain linear polymers of alpha, omega dichloropolydiethyl germanosiloxane. As another specific example of a desirable material, alpha, omega- dichloropolydiphenyl germanosiloxane is obtained by heating and mixing together dichloro diphenyl silane with tetrameric cyclodiphenyl germanium oxide at a temperature of about 200° C.

The drawing of the present patent application illustrates certain embodiments of the invention with respect to the relative proportions of the starting materials. In the drawing, the area designated as ABCD is the region in which the predominant species are cyclic molecules, while the area designated as XYZ is the region in which the predominant species are linear chain molecules.

An example showing the use of only two starting materials is the composition B in the drawing. Point B has the following values:

$$y'=0.25$$
$$y=0.5$$

The ultimate formula for the composition is

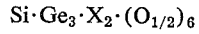

Possible starting materials to provide this composition are accordingly:

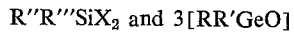

Germanosiloxanes of the above type may also be prepared by mixing at least three of the four components: $R''R'''SiX_2$, $RR'GeX_2$, [$R''R'''SiO$] and [$RR'GeO$], wherein the definitions are as set forth above. Depending on the desired overall composition, i.e., the ratio of X (for example, halogen) versus the sum of Si and Ge, and the ratio of Si versus the sum of Ge and Si controlled yields of various individual polymeric compositions are obtained.

The compositions yielding oligomeric and polymeric cyclic and linear germanosiloxanes are made up by reacting at least three of the four components $R''R'''SiX_2$, $RR'GeX_2$, [$R''R'''SiO$] and [$RR'GeO$] as to give an overall composition which lies within the composition diagram shown on the drawing of the present patent application.

In the drawing, $y$ is the mole ratio $X/(Si+Ge)$ and $y'$ is the ratio $Si/(Si+Ge)$. The desired compositions are located in the range wherein $(y'+y)/2$ is not greater than 1, and $y$ has a value from 0 to 2, and $y'$ has a value from 0.001 to 1.

In order further to illustrate the use of the above diagram, a specific product having composition A in the drawing has the following values $$y'=0.5, \text{ and}$$
$$y=0.25$$

In order to produce such a composition having the ultimate formula $$4Si \cdot 4Ge \cdot 2X \cdot (O_{1/2})_{14}$$

the reactants may be supplied in the following proportion by either of the two combinations of reagents.

Group 1:
    1—R″R‴SiX$_2$
    3—[R″R‴SiO]
    4—[RR′GeO]

Group 2:
    1—RR″GeX$_2$
    3—RR′GeO
    4—R″R‴SiO

Other compositions can similarly be prepared by controlling the proportions of the starting materials. For example, when the over-all $y=Cl/(Si+Ge)$ ratio is 1.00 and the $y'=Si/(Si+Ge)$ ratio is 0.25, a maximum yield of the trimer compound $$Cl(CH_3)_2Ge\text{—}O\text{—}Si(CH_3)_2\text{—}OGe(CH_3)_2Cl$$

is obtained. This yield is about 24% of the total reaction mixture, with the rest being higher polymers. Similarly, when the overall $Cl/(Si+Ge)$ ratio in the reaction mixture is 0.75 and the $Si/Si+Ge$ ratio is 0.5, about 40% of the mixture consists of the tetramer compound $$Cl(CH_3)_2Ge\text{—}O\text{—}Si(CH_3)_2\text{—}O\text{—}$$
$$Si(CH_3)_2\text{—}O\text{—}Ge(CH_3)_2Cl$$

Cyclic polymeric germanosiloxanes are also included in the present invention, e.g., compositions coming under the general formula but where $q$ and $z$ are zero, e.g., the X groups such as halogen are not present. The general formula for the group of cyclic compositions is $$[-\underset{\underset{R'}{|}}{\overset{\overset{R}{|}}{Ge}}-O-]_n \cdot [-\underset{\underset{R'''}{|}}{\overset{\overset{R''}{|}}{Si}}-O-]_m$$

where $n$ and $m$ are numbers totaling from 3 to 100. These cyclic species are prepared by mixing and heating, with or without a catalyst, a dihydrocarbylgermaniumoxide [RR′GeO] and a dihydrocarbylsiliconoxide $$[RR″R‴SiO]$$

in the molar proportions expressed by $n$ and $m$.

Separation of individual linear and ring-type oligomers or polymers such as those described above is carried out by distillation, low temperature column chromatography, high temperature vapor phase chromatography, etc. The individual polymeric products may thus be separated from the reaction mixture, however, the products are generally obtained as mixtures of polymers which may be used in the form of mixtures for certain industrial applications.

The dihydrocarbyl germanium oxide starting material such as tetrameric diphenyl germanium oxide is prepared by reacting diphenyl dichlorogermane with aqueous sodium hydroxide.

The reaction is preferably conducted in a closed vessel, although the use of relatively high boiling starting materials, e.g., a boiling point of at least 200° C. for the silane starting material, permits the use of an open vessel.

While the silane and germanium oxide components described above react without a catalyst, it has been found that Lewis acid type catalysts provided a faster reaction to obtain the present products. For example, aluminum chloride, boron trifluoride, zinc dichloride, ferric tribromide and antimony pentachloride are representative catalysts which are useful in the present process.

The aforesaid reactants are preferably sealed into a reaction tube using an inert atmosphere such as nitrogen gas. The reaction tubes are then maintained at a temperature in the range of from 10° C. to 300° C. for a period of time of from 1 hour to 200 hours, with the higher temperatures providing a shorter reaction time. If desired a solvent such as benzene, diethyl ether, or hexane may be employed, although a solvent is not essential. The polymeric products of the present invention have good stability.

The following examples illustrate specific embodiments of the present invention.

EXAMPLE 1

The preparation of the methyl substituted polymeric germanosiloxane is shown in the present example. A pressure tube is charged with 1.3 moles of dimethyldichlorosilane, 1.3 moles of dimethyldichlorogermane and 0.65 mole of octamethyltetragermanium tetroxide. The above reactants when plotted on the diagram correspond to $y=1.00$, and $y'=0.25$. The tube containing the mixture is sealed under nitrogen, and is then heated in a tube furnace at 120° C. The progress of the reaction is followed by withdrawing a tube from the furnace from time to time and measuring the presence of the desired polymeric reaction products by proton nuclear magnetic resonance. The trimeric molecule of the formula $$Cl(CH_3)_2Ge\text{—}O\text{—}Si(CH_3)_2\text{—}O\text{—}Ge(CH_3)_2Cl$$

appears in a yield of ca. 24%.

In order to separate the desired chain compounds up to the decameric form and higher from the reaction mixture, various separation procedures such as chromatographic absorption and distillation are employed. Distillation is preferably carried out under vacuum conditions. For example, the trimeric compound $$Cl-\underset{\underset{CH_3}{|}}{\overset{\overset{CH_3}{|}}{Ge}}-O-\underset{\underset{CH_3}{|}}{\overset{\overset{CH_3}{|}}{Si}}-O-\underset{\underset{CH_3}{|}}{\overset{\overset{CH_3}{|}}{Ge}}-Cl$$

shown above has an approximate boiling point of 50° C. at 0.01 mm. pressure. Separation of the trimer from higher oligomers is readily carried out by distillation.

Identification and molecular characterization of the chain compositions is conducted by the following procedure. The trimer consisting of 2 Ge atoms and 1 Si atom gives proton nuclear magnetic resonances at $-0.83$ and $-0.15$ p.p.m. in the calculated ratio of 2:1 for methyl groups on germanium in terminal groups versus methyl groups on silicon in middle groups.

The cyclic tetrameric and trimeric dimethylgermanium oxide shows a single sharp proton nuclear magnetic resonance peak at $-0.50$ and $-0.47$ p.p.m. respectively. The resonance for the dimethyl dichlorogermane is seen at $-1.167$ p.p.m. and that of the dimethyl dichlorosilane at $-0.80$ p.p.m. The reaction product of the reaction of dimethyl dichlorosilane and tetrameric dimethylgermanium oxide shows in addition to the resonances seen above, several peaks in the range $-0.833$ and $-0.817$ p.p.m. relative to internal tetramethylsilane. From the fact that these peaks form a cluster of signals lying between those of the dimethyl dichlorogermane and the dimethylgermanium oxide, and the variation of their relative intensities with the relative proportions of the reactants, these signals are assigned to end groups in germanosiloxane chains. This is confirmed by a mathematical treatment assuming ligand exchange of chlorine and oxygen atoms on the dimethyl germanium and dimethylsilicon moiety. Additional peaks in the ranges $-0.6$ to $0.5$ p.p.m. are attributed to various types of germanium middle groups in chains and silicon end groups. Peaks in the range of −0.15 to 0 p.p.m. are silicon middle groups.

The product is characterized by excellent thermal stability, being stable in air against oxidation and thermal degradation at temperatures of 250° C.

EXAMPLE 2

Using the procedure described in Example 1, but with a different ratio of reactants, a quantity of 3 moles of dimethyldichlorosilane, 1 mole of dimethylsiloxane and 4 moles of dimethylgermoxane ($y=0.75$, and $y'=0.5$ in the diagram) are reacted at 120° C. to give a reaction product consisting of about 40% of the tetramer molecule

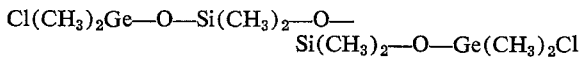

and higher molecular weight species of the formula

The various polymeric forms are soluble in hydrocarbon and chlorocarbon solvents, similarly, when using

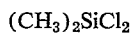

$(CH_3)_2GeCl_2$, $[(CH_3)_2SiO]$, and $[(CH_3)_2GeO]$ so as to give an overall composition corresponding to the same $y$ and $y'$ values, a similar composition is obtained.

EXAMPLE 3

The use of a bromine group as a substituent in the products and process of the present invention is shown by following the procedure of Example 1, using dibromo diethylsilane having the formula $Br_2Si(C_2H_5)_2$. This reagent is used with octaethyl tetragermanium tetroxide as the germanium oxygen component in the ratio of 1 mole of octaethyl tetragermanium tetroxide, and 0.5 mole of dibromo diethylsilane ($y=0.22$ and $y'=0.11$ in the diagram). The products are similar to Example 1 above, e.g., amount of tetramer obtained as a colorless liquid is about 15 mole percent of the polymeric products. The linear products also include higher polymeric forms such as the pentamer, hexamer, octamer, etc., e.g., $$Br—[Ge(C_2H_5)_2—O]_n[Si(C_2H_5)_2O]_m—Ge(C_2H_5)_2Br$$

The various polymeric forms are soluble in benzene, carbon disulfide, hydrocarbon and chlorocarbon solvents such as carbon tetrachloride.

EXAMPLE 4

The use of phenyl groups as a substituent in the products and process of the present invention is shown by following the procedure of Example 1, using dichloro diphenyl silane having the formula $(C_6H_5)_2SiCl_2$ ($y=0.1$ and $y'=0.05$ in the diagram) to obtain the ultimate product

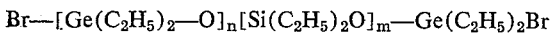

The reactant is used with octaphenyl tetragermanium tetroxide as the germanium oxygen ring reactant in the ratio of 1 mole of octaphenyl tetragermanium tetroxide and 0.2 mole of dichloro diphenyl silane. The reaction products include higher polymeric forms such as the pentamer, hexamer, octamer, etc.

The various polymeric forms are soluble in benzene, carbon disulfide, hydrocarbon and chlorocarbon solvents such as carbon tetrachloride.

EXAMPLE 5

The use of an unsaturated group as a substituent in the products and process of the present invention is shown by following the procedure of Example 1, using diiodo divinyl silane in the presence of 1% $AlCl_3$ catalyst with cyclic $[(CH_2=CH)_2GeO]_4$. The reaction products include higher polymeric forms such as the pentamer, hexamer, octamer, etc., e.g.,

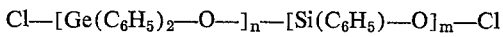

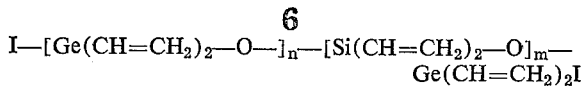

The various polymeric forms are soluble in benzene, carbon disulfide, hydrocarbon and chlorocarbon solvents such as carbon tetrachloride, and are separated by column chromatography. In the present example the major products are the dimer, trimer and tetramer of alpha, omega-diiodopolydivinyl germanosiloxanes.

The unsaturated alkyl type of the present polymeric germanosiloxanes have utility as monomeric starting materials for use in the production of germanium and silicon containing polymers, and are particularly desirable for use in copolymerization with unsaturated monomers such as vinyl chloride, vinyl acetate, styrene, acrylonitrile, butadiene, etc. Silicon containing monomers may also be copolymerized with the present germanosiloxanes. Other germanium or silicon containing compounds such as $RGeX_3$, for example $CH_3GeCl_3$, $C_6H_5Ge(OCH_3)_3$, $$C_2H_5Si[N(CH_3)_2]_3$$

and $CH_2CHSi—(SC_2H_5)_3$, may also be used as cross linking agents in copolymers of the present linear polymeric germanosiloxanes to give higher molecular weight copolymers.

EXAMPLE 6

The use of methoxyl groups as a substituent in the products and process of the present invention is shown by following the procedure of Example 1 using dimethoxydiethylsilane, diethylsiloxane, dimethoxyethylgermane and octaethyl tetragermanium tetroxide as the reactants. The resulting products are similar to Example 1 above, e.g., consisting of trimers, tetramers including higher linear species such as pentamers, hexamers and octamers, e.g.,

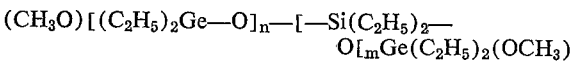

The various polymeric forms are soluble in benzene, carbon disulfide, hydrocarbon and chlorocarbon solvents.

EXAMPLE 7

The use of methylthio groups as a substituent in the products of the present invention is shown by following the procedure of Example 1 using divinyldimethylthiosilane, divinyldimethylthiosilane, divinylsiloxane and divinylgermanium oxide in several proportions as the reagents. The resulting products are similar to the ones in Example 1 above, e.g., consisting of trimers, tetramers, including higher linear species such as pentamer, hexamers, and octamers, e.g.,

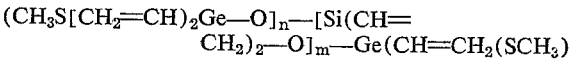

The various polymers forms or mixtures thereof are soluble in hydrocarbon and chlorocarbon solvents and in ethers.

EXAMPLE 8

Predominantly cyclic germanosiloxanes are obtained when in the generalized reaction mixture as set forth above, consisting of $RR'GeX_2$, $[RR'GeO]$, $R''R'''SiX_2$ and $[R''R'''SiO]$ the concentrations of $RR'GeX_2$ and $R''R'''SiX_2$ is zero. A mixture consisting of 1 mole of octamethylcyclotetrasiloxane corresponding to the above component having the general formula $(R''R'''SiO)$ and 1 mole of octamethylcyclotetragermoxane corresponding to the above component having the general formula $[RR'GeO]$ ($y=0$ and $y'=0.5$ in the diagram) when heated with a catalytic amount (0.01 mole) of aluminum chloride in a sealed tube at 150° C. yields a mixture of cyclic germanosiloxanes of the general composition

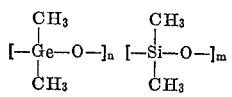

where $n$ plus $m$ is 50. Trimers ($n+m=3$) tetramers ($n+m=4$) and higher molecular weight species where $n+m$ is greater than 5 can be separated from the reaction mixture by chromatography. The nmr spectrum shows rather sharp resonances of the type attributable to ring structures. Analogous compositions are obtained when the relative mole proportions of the two reactants range from 49–1 to 1–49.

The polymeric germanosiloxanes of the present invention, particularly the trimeric and higher polymeric forms are also useful as functional fluids, e.g., as heat transfer media, lubricants, and hydraulic fluids. In this relationship the pronounced thermal stability of such compositions provides for long life of the functional fluids.

What is claimed is:

1. Chain germanosiloxane polymers having the general formula

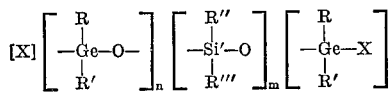

in which R, R', R", and R''' are radicals selected from the group consisting of hydrocarbyl radicals having from 1 to 20 carbon atoms, X is selected from the group consisting of fluorine, chlorine, bromine, iodine, alkoxyl, thioalkyl, dialkylamino, and cyano groups in which the alkyl radicals have from 1 to 20 carbon atoms, and $n$ plus $m$ is a number from 1 to 100 with $m$ being at least 1.

2. The polymeric composition having the formula

Cl—[Ge(CH$_3$)$_2$—O—]$_n$—[Si(CH$_3$)$_2$—O—]$_m$Ge(CH$_3$)$_2$—Cl where $n$ plus $m$ is a whole number from 1 to 100 with $m$ being at least 1.

3. The polymeric composition having the formula
Cl(CH$_3$)$_2$Ge—O—Si(CH$_3$)$_2$—O—Ge(CH$_3$)$_2$Cl.

4. The polymeric composition having the formula

Cl(CH$_3$)$_2$Ge—O—Si(CH$_3$)$_2$—O—Si(CH$_3$)$_2$—O—Ge(CH$_3$)$_2$Cl

5. The polymeric composition having the formula

Cl—[Ge(C$_6$H$_5$)$_2$—O—]$_n$—[Si(C$_6$H$_5$)$_2$—O—]$_m$Ge(C$_6$H$_5$)$_2$—Cl where $n$ plus $m$ is a whole number from 1 to 100 with $m$ being at least 1.

6. The polymeric composition having the formula

CH$_3$O—[Ge(C$_2$H$_5$)$_2$—O—]$_n$—[Si(C$_2$H$_5$)$_2$—O—]$_m$—Ge(C$_2$H$_5$)$_2$—OCH$_3$ where $n$ plus $m$ is a whole number from 1 to 100 with $m$ being at least 1.

7. The polymeric composition having the formula

CH$_3$S—[Ge(CH=CH$_2$)$_2$—O—]$_n$—[Si(CH=CH$_2$)$_2$—O—]$_m$Ge(CH=CH$_2$)$_2$SCH$_3$ where $n$ plus $m$ is a whole number from 1 to 100 with $m$ being at least 1.

8. The process for preparing a germanosiloxane polymer having the formula

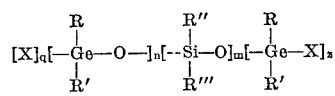

in which R, R', R" and R''' are selected from the group consisting of hydrocarbyl radicals having from 1 to 20 carbon atoms; X is selected from the group consisting of fluorine, chlorine, bromine, iodine, alkoxyl, thioalkyl, dialkylamino and cyano in which the alkyl radicals have from 1 to 20 carbon atoms, and $n$ plus $m$ is a number from 1 to 100, $m$ being at least 1, which comprises mixing and heating together 3 of the 4 reactants R"R'''SiX$_2$, [R"R'''SiO], [RR'GeO]$_4$ and RR'GeX$_2$ where the symbols $q$ and $z$ are equal and are whole numbers from zero to one.

9. The process for preparing a chain polymeric germanosiloxane having the formula

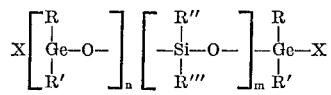

in which, R, R', R" and R''' are selected from the group consisting of hydrocarbyl radicals having from 1 to 20 carbon atoms; X is selected from the group consisting of fluorine, chlorine, bromine, iodine, alkoxyl, thioalkyl, dialkylamino and cyano; groups in which the alkyl radicals have from 1 to 20 carbon atoms and $n$ plus $m$ is a number from 1 to 100 with $m$ being at least 1, which comprises mixing and heating R"R'''SiX$_2$ and [R"R'''SiO] together with a cyclic dihydrocarbyl germanium oxide tetramer, [RR'GeO]$_4$ and RR'GeX$_2$.

10. The process for preparing a linear polymeric germanosilixane having the formula Cl[Ge(CH$_3$)$_2$—O]$_n$—[Si(CH$_3$)$_2$—O—]$_m$Ge(CH$_3$)$_2$—Cl where $n$ plus $m$ is a whole number from 1 to 100 with $m$ being at least 1, which comprises mixing and heating together (CH$_3$)$_2$SiCl$_2$ and [(CH$_3$)$_2$SiO] together with (CH$_3$)$_2$GeCl$_2$ and the cyclic germanium oxide tetramer [(CH$_3$)$_2$GeO]$_4$.

11. The process for preparing a linear germanosiloxane having the formula

Cl(CH$_3$)$_2$Ge—O—Si(CH$_3$)$_2$—O—Ge(CH$_3$)$_2$Cl which comprises heating and mixing together (CH$_3$)$_2$SiCl$_2$ (CH$_3$)$_2$GeCl$_2$ and (CH$_3$)$_2$GeO in the approximate mole proportions 1:1:2.

12. The process for preparing a linear germanosiloxane having the formula

Cl(CH$_3$)$_2$Ge—O—Si(CH$_3$)$_2$—O—Si(CH$_3$)$_2$—O—Ge(CH$_3$)$_2$Cl which comprises mixing and heating together (CH$_3$)$_2$SiCl$_2$ (CH$_3$)$_2$GeO and (CH$_3$)$_2$Sio in approximate mole proportions 3:4:1.

13. The process for preparing a linear polymeric germanosiloxane having the formula Cl—[Ge(C$_6$H$_5$)$_2$—O—]$_n$—[Si(C$_6$H$_5$)$_2$—O—]$_m$Ge(C$_6$H$_5$)$_2$—Cl where $n$ plus $m$ is 1 to 100, with $m$ being at least 1, which comprises mixing and heating together (C$_6$H$_5$)$_2$SiCl$_2$, together with (C$_6$H$_5$)$_2$GeCl$_2$ and the cyclic tetramer [(C$_6$H$_5$)$_2$GeO]$_4$.

14. The process for preparing a linear polymeric germanosiloxane having the formula CH$_3$S—[Ge(CH=CH$_2$)$_2$—O—]$_n$—[Si(CH=CH$_2$)$_2$—O]$_m$Ge(CH=CH$_2$)$_2$—SCH$_3$ where $n$ plus $m$ is a number from 1 to 100, with $m$ being at least 1, which comprises mixing and heating together at least 3 of the 4 reactants (CH=CH$_2$)$_2$Si(SCH$_3$)$_2$, [(CH=CH)$_2$SiO]$_4$, (CH=CH$_2$)$_2$Ge(SCH$_3$)$_2$ and the cyclic tetramer [(CH$_3$=CH)$_2$GeO]$_4$.

15. Process for the preparation of cyclic polymeric germanosiloxanes having the formula

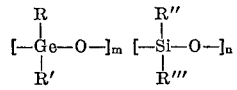

in which R, R', R" and R''' are radicals selected from the group consisting of hydrocarbyl radicals having from 1 to 20 carbon atoms, which process comprises mixing and heating [RR′GeO] together with [R″R‴SiO] in the relative mole proportions of from 49:1 to 1:49, with $n$ and $m$ each being at least 1 and totaling from 3 to 50.

16. The process for preparing a linear polymeric germanosiloxane as in claim 8 having the formula $$CH_3O-[Ge(C_2H_5)_2-O-]_n-[Si(C_2H_5)_2-O-]_mGe(C_2H_4)_2-OCH_3$$

where $n$ plus $m$ is a whole number from 1 to 100, with $m$ being at least 1, which comprises mixing and heating together $(C_2H_5)_2Si(OCH_3)_2$, $[(C_2H_5)_2SiO]$ $$(C_2H_5)_2Ge(OCH_3)_2$$

and the cyclic tetramer $[(C_2H_5)_2GeO]_4$.

References Cited
UNITED STATES PATENTS

| | | | |
|---|---|---|---|
| 2,998,440 | 8/1961 | Foster et al. | 260—429.7 |
| 3,153,000 | 10/1964 | Takimoto et al. | 260—2 |

OTHER REFERENCES

Savitskii et al.: Chem. Abstracts, 54 (1960), col. 14106h, Abstract of Vysok. Soed., 1959 (10), pp. 1502–6.

Andrianov: Polymers with Inorganic Main Chain (English translation), U.S. Dept. of Commerce, Office of Technical Services # 63–31341, Joint Publications Research Service # 20,272, 1963, pp. 22–23, 52–54, 548, 610.

Quane et al.: Chem. Reviews, 63 (1963) pp. 420–1.

Andrianov: Polymers with Inorganic Main Chain (English translation), Joint Publications Research Service, U.S. Dept. of Commerce, July 1963, pp. 52–54, 548–9, 610–1.

TOBIAS E. LEVOW, Primary Examiner

A. P. DEMERS, Assistant Examiner

U.S. Cl. X.R.

252—42.7, 74; 260—2, 448.2

C-07-21-Z349-A*S

PO-1050
(5/69)

UNITED STATES PATENT OFFICE
CERTIFICATE OF CORRECTION

Patent No. 3,510,502            Dated May 5, 1970

Inventor(s)     Kurt Moedritzer

It is certified that error appears in the above-identified patent and that said Letters Patent are hereby corrected as shown below:

Column 1, line 48, "chloride" should be "chlorine".

Column 2, line 22, "cyclo-" should be "cyclodi-".

Column 3, lines 46 to 51, in place of the small "[ ]" there should be large "[ ]".

Column 6, line 30, "dimethoxyethylger-" should be "dimethoxydiethylger-".

Column 6, line 37, after the first "0" should be a "]".

Column 6, lines 73 to 75, in place of the small "[ ]" there should be large "[ ]".

Column 7, line 8, "49-1 to 1-49." should be "49:1 to 1:49".

SIGNED AND
SEALED
DEC 22 1970

(SEAL)
Attest:

Edward M. Fletcher, Jr.
Attesting Officer

WILLIAM E. SCHUYLER, JR.
Commissioner of Patents